US008219845B2

(12) United States Patent
Li et al.

(10) Patent No.: US 8,219,845 B2
(45) Date of Patent: Jul. 10, 2012

(54) TIMER SERVICE USES A SINGLE TIMER FUNCTION TO PERFORM TIMING SERVICES FOR BOTH RELATIVE AND ABSOLUTE TIMERS

(75) Inventors: Eric Li, Redmond, WA (US); Robert Earhart, Snohomish, WA (US); Dragos C. Sambotin, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1125 days.

(21) Appl. No.: 11/801,308

(22) Filed: May 9, 2007

(65) Prior Publication Data

US 2008/0282103 A1    Nov. 13, 2008

(51) Int. Cl.
G06F 1/14    (2006.01)
G06F 1/00    (2006.01)
(52) U.S. Cl. ......................................... 713/500; 713/600
(58) Field of Classification Search ................... 713/500, 713/600
See application file for complete search history.

(56) References Cited

U.S. PATENT DOCUMENTS

| | | | | |
|---|---|---|---|---|
| 4,712,072 A | * | 12/1987 | Kawanabe | 327/23 |
| 5,758,137 A | * | 5/1998 | Armstrong et al. | 713/502 |
| 6,029,190 A | | 2/2000 | Oliver | |
| 6,125,404 A | * | 9/2000 | Vaglica et al. | 713/375 |
| 6,314,471 B1 | | 11/2001 | Alverson et al. | |
| 6,427,161 B1 | | 7/2002 | LiVecchi | |
| 6,473,820 B1 | | 10/2002 | Zhang | |
| 6,546,443 B1 | | 4/2003 | Kakivaya et al. | |
| 6,560,626 B1 | | 5/2003 | Hogle et al. | |
| 6,675,192 B2 | | 1/2004 | Emer et al. | |
| 6,778,418 B2 | * | 8/2004 | Meguro | 363/165 |
| 6,922,724 B1 | | 7/2005 | Freeman et al. | |
| 7,039,472 B2 | * | 5/2006 | Sugimoto et al. | 700/14 |
| 7,702,957 B2 | * | 4/2010 | Shinn et al. | 714/38.1 |
| 2002/0107550 A1 | * | 8/2002 | Amely-Velez | 607/9 |
| 2004/0139433 A1 | | 7/2004 | Blythe et al. | |
| 2006/0059270 A1 | * | 3/2006 | Pleasant et al. | 709/237 |
| 2006/0064687 A1 | | 3/2006 | Dostert | |
| 2006/0117316 A1 | | 6/2006 | Cismas et al. | |
| 2007/0179828 A1 | * | 8/2007 | Elkin et al. | 705/8 |
| 2007/0198869 A1 | * | 8/2007 | Miyazaki | 713/500 |
| 2008/0013450 A1 | * | 1/2008 | Worley et al. | 370/230 |

OTHER PUBLICATIONS

"Data Processing System Timing Facility" IBM technical Disclosure Bulletin, vol. 10 ISS. No. 10 p. 30 Mar. 1, 1972.*
Cai, et al.,"Towards a High Integrity Real-Time Java Virtual Machine", Department of Computer Science, University of York, UK, (Lecture Notes in CS 2003, vol. 2889).
Powell, et al., "SunOS Multi-thread Architecture", pp. 1-14, USENIX—Winter '91—Dallas, TX.

* cited by examiner

Primary Examiner — Vincent Tran
(74) Attorney, Agent, or Firm — Russell S. Krajec; Krajec Patent Offices, LLC

(57) ABSTRACT

A timer service uses a single timer function to perform timing services for both relative and absolute timers. The first timers from a sorted array of absolute timers and relative timers are used in a function that will return when the earliest absolute timer expires or will timeout when the earliest relative timer expires. The timer function may be interrupted when a new timer is added to one of the arrays. The function will operate in a predictable and consistent manner, even when a system clock is adjusted.

20 Claims, 3 Drawing Sheets

100
SYSTEM WITH TIMER SERVICE

TIMER SERVICE USES A SINGLE TIMER FUNCTION TO PERFORM TIMING SERVICES FOR BOTH RELATIVE AND ABSOLUTE TIMERS

BACKGROUND

Timer services may be provided at an operating system level for various computer systems. Timer services may be used by various applications or other services to initiate various functions at a future time.

Timers may be defined in absolute and relative manners. In an absolute timer, the timer may be set to go off or respond at a specific time according to a system clock. A relative timer may be set to operate at a certain number of minutes or seconds after being set, without regard to the system clock.

Timer services may behave erratically or unpredictably when changes are made to a system clock. Changes may be made, for example, when the system changes time zones, during the change between daylight savings time and standard time occurs, or when the system clock is reset for some other reason, including slight adjustments to the clock to coordinate with another system.

SUMMARY

A timer service uses a single timer function to perform timing services for both relative and absolute timers. The first timers from a sorted array of absolute timers and relative timers are used in a function that will return when the earliest absolute timer expires or will timeout when the earliest relative timer expires. The timer function may be interrupted when a new timer is added to one of the arrays. The function will operate in a predictable and consistent manner, even when a system clock is adjusted.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
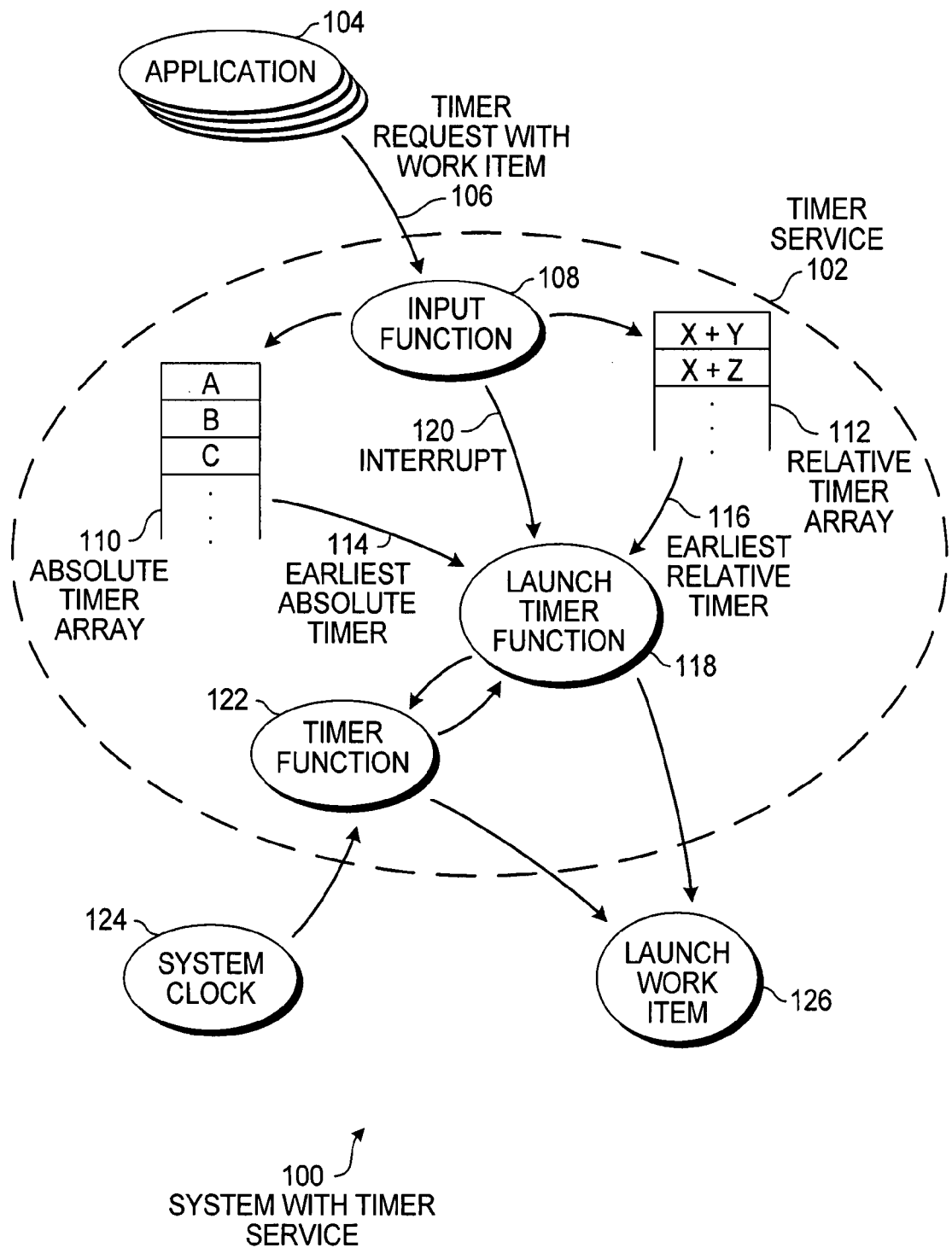
FIG. 1 is a diagram of an embodiment showing a system with a timer service.

A timing service may be an operating system level service that may be used by multiple applications to initiate certain actions at a future time. Timers may be defined in either an absolute mode, where a specific time is defined with respect to the system clock, or a relative mode, where the time for an action is defined relative to the current time.

Timing services operate using a system clock as the standard for determining when a timer is to be fired or actuated. When the clock is shifted or adjusted, such as for daylight savings time, when a mobile device changes time zones, or when a system clock is adjusted to correspond with a master clock, the effects on a timing service may be minimized by providing a timing function that will fire on either the first absolute timer or the first relative timer.

Many absolute and relative timers may be stored in sorted arrays that may be used to generate a single timer function in the timing service. When starting a timer function, any timers that are past due may be dispositioned prior to starting the timer function.

When a change to the system clock occurs, the timer function will fire at the sooner of the absolute or relative timer. In general, a shift backward or forward in a system clock will delay or hasten the action of an absolute timer but a relative timer will still operate independent of the system clock change.

The timing service consolidates timing operations from many different applications and services into a single function. By consolidating the timers, many separate threads and functions may be reduced into a single one, relieving the system of many processes and threads that may be used for other functions.

Specific embodiments of the subject matter are used to illustrate specific inventive aspects. The embodiments are by way of example only, and are susceptible to various modifications and alternative forms. The appended claims are intended to cover all modifications, equivalents, and alternatives falling within the spirit and scope of the invention as defined by the claims.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system with a timer service. The timer service may aggregate various timing or wait actions from several different applications into a single timer function. By aggregating many different timer requests into a single service, multiple timer functions that would otherwise use multiple computing resources may be consolidated into a single function.

The timer service of embodiment 100 may handle both absolute and relative timer requests. An absolute timer request may be activated at a specific time as defined by a system clock, which is in contrast to a relative timer request which may be active a certain amount of time after the current time.

The difference between absolute and relative timers may be seen when a system time change occurs. For example, if the current system time is 10:00, an absolute timer may be set for 10:15 and a relative timer may be set for 15 minutes from the current time. If there is no change to the system clock, both timers may become due at the same time, or at 10:15. If the current system clock is adjusted forward five minutes in order to correlate with a network administered time, for example, the current time would actually be 10:05. In the example, the relative timer would become due at 10:20, since it is due 15 minutes after the current time, but the absolute timer would still become due at 10:15.

Various applications 104 may send a timer request with a work item 106 to the timer service 102. The timer request may include a work item that may be a specific function that is to be called at the specified time. The work item may also include a context, which may include data or pointers to data that may be used by the work item when the work item is executed.

In some instances, a timer request may be defined with a period for repeating the work item. For example, a timer request may be established to initiate a partial backup operation each evening at a specific time. Another request may have a full backup operation performed on the first Sunday of each month. Different embodiments may enable different periodicity definitions for timer requests.

The timer request 106 may be received by an input function 108. The input function 108 may determine if the timer is a relative or absolute timer request and store the timer request in either an absolute timer array 110 or a relative timer array 112. In some instances, the absolute timer array 110 and relative timer array 112 may be sorted in order of chronology so that the timing requests may be pulled from the arrays in order of the earliest request.

The earliest absolute timer request 114 and the earliest relative timer request 116 may be sent to a launch timer function 118. The timer function 122 may operate with the system clock 124 to wait until one of the two timer requests 114 or 116 are satisfied. When one of the timer requests are satisfied, the appropriate work item may be launched 126, and the timer function may be restarted with the next set of timers.

When restarting the timer function, the launch timer function 118 may evaluate whether the time for any unfulfilled timer requests have been passed. If additional timer requests exist for which the time has passed, the work items for those timer requests may also be launched.

When a new request 106 is received by the input function 108, an interrupt 120 may be generated if the new timer request is earlier than its corresponding timer request that is in the timer function 122. For example, if a new timer request is for a relative timer and has an activation time that is earlier than the earliest relative timer 116, an interrupt 120 may be created and the timer function 122 halted. The timer function 122 may then be restarted with the new timer request.

Figure 2:
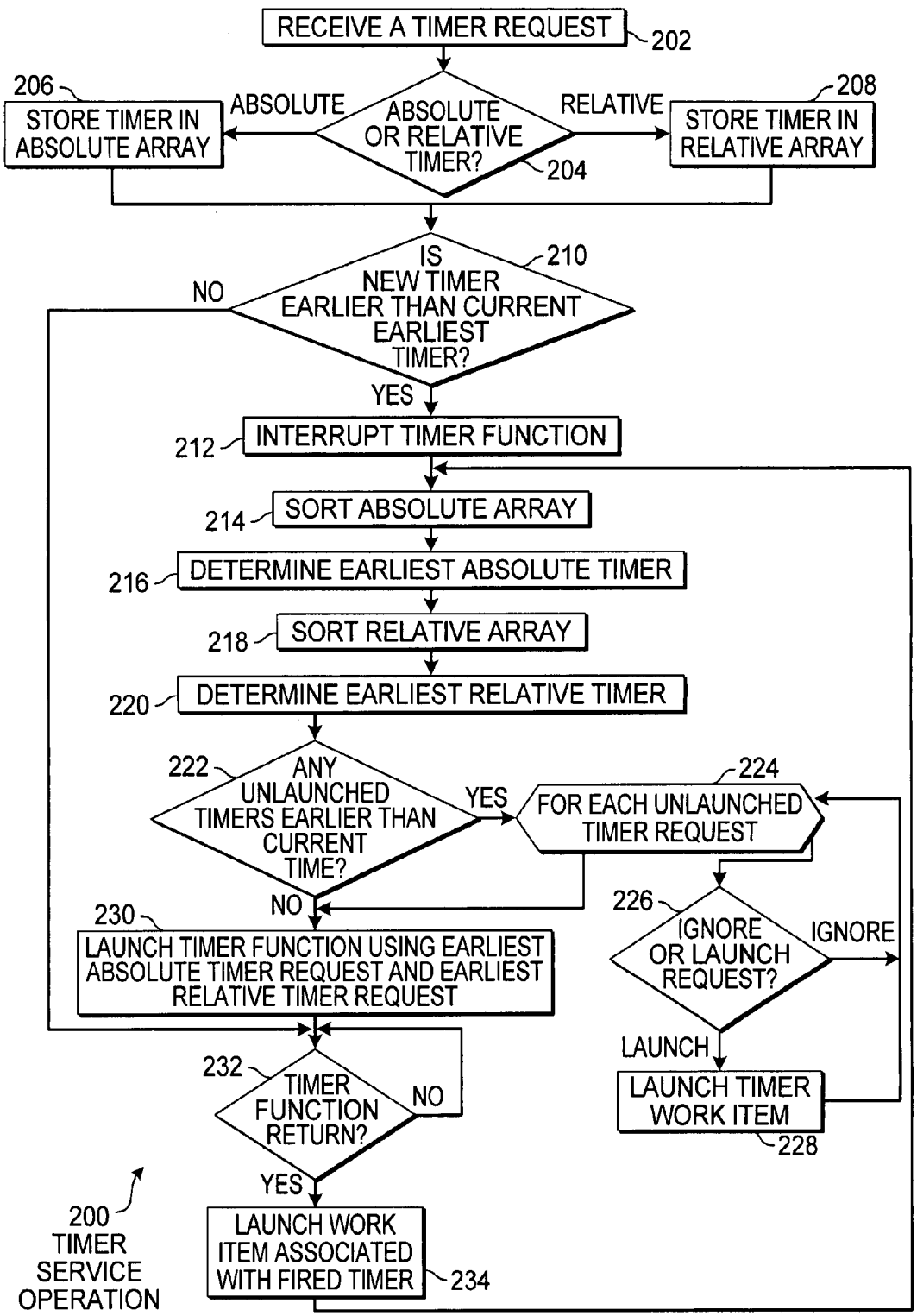
FIG. 2 is a flowchart illustration of an embodiment showing a timer service operation.

FIG. 2 is a flowchart illustration of an embodiment 200 showing a timer service operation.

A timer request is received in block 202. A determination is made in block 204 as to whether the timer request is an absolute timer or a relative timer. If the timer request is an absolute timer, the timer is stored in the absolute timer array in block 206, otherwise the timer is stored in the relative timer array in block 208.

If the new timer is earlier than the current earliest timer in block 210, the timer function is interrupted in block 212. An interruption may be performed when the new timer request is an earlier timer request than one of the timers in the current timer function. An interruption may be performed in block 212 when the new timer is earlier than the current time of the same type. For example, a new timer request that is a relative timer and earlier than the current earliest relative timer may initiate an interruption in block 212. A new timer request that is an absolute timer but is earlier than the current earliest relative timer may not initiate an interruption unless it was earlier than the current earliest absolute timer.

The array of absolute timers is sorted in block 214 and the earliest absolute timer is determined in block 216. Similarly, the array of relative timers is sorted in block 218 and the earliest relative timer is determined in block 220. In some embodiments, the arrays of timers may not be sorted. In other embodiments, sorting the arrays may make it easier to select the earliest timer.

If any unlaunched timers exist that are earlier than the current time in block 222, the timers may be dispositioned. In some instances, a timer may be dispositioned by ignoring the timer, while in other instances the work item associated with the timer may be launched. Some timers may have a setting that may be evaluated to determine if the work item is to be launched or ignored in such a situation.

If the timer is to be launched in block 226, the work item is launched in block 228.

If there are no unlaunched timers in block 222 or if all the timers have been processed in block 224, a timer function is launched in block 230 using the earliest absolute timer request and the earliest relative timer request.

The timer function as started may have a time function set to expire on the expiration time of the absolute timer and a timeout function set to the relative timer. A time function may be a function call that evaluates the system clock until a specified time is reached. When the time is reached, the time function may return and cause the work item for the absolute timer request to be executed.

The timeout function may be a function that waits for a specified period of time before returning. The timeout function may not use the system clock, but may count a specific number of clock cycles on a system or use some other method for determining if a specific wait period has been reached.

By configuring a timer function in this manner, a change to the system clock may affect the absolute timers and relative timers appropriately. A change to the system clock may cause absolute timers to be activated earlier or later, depending on the time adjustment. However, changes to the system clock may not adversely affect any relative timers, since the relative timers may be activated by a timeout function rather than the time function.

After the timer function has returned in block 232, a work item associated with the fired timer is launched in block 234. The process returns to block 214.

When a new timer is added in block 210 but is not earlier than the current timers, the process continues to block 232, waiting for the timer function to return.

The embodiment 200 is a method to consolidate many different timer functions into a single process operating on a system. The timer service executes the timers that are the next to be executed so that many different timer threads or processes exist on a system. Each timer request is processed in turn based on the earliest to be executed.

The timer service executes absolute timer requests that reference the system clock as well as relative timers that may use an elapsed actual time as opposed to a system time for actuation.

Figure 3A:
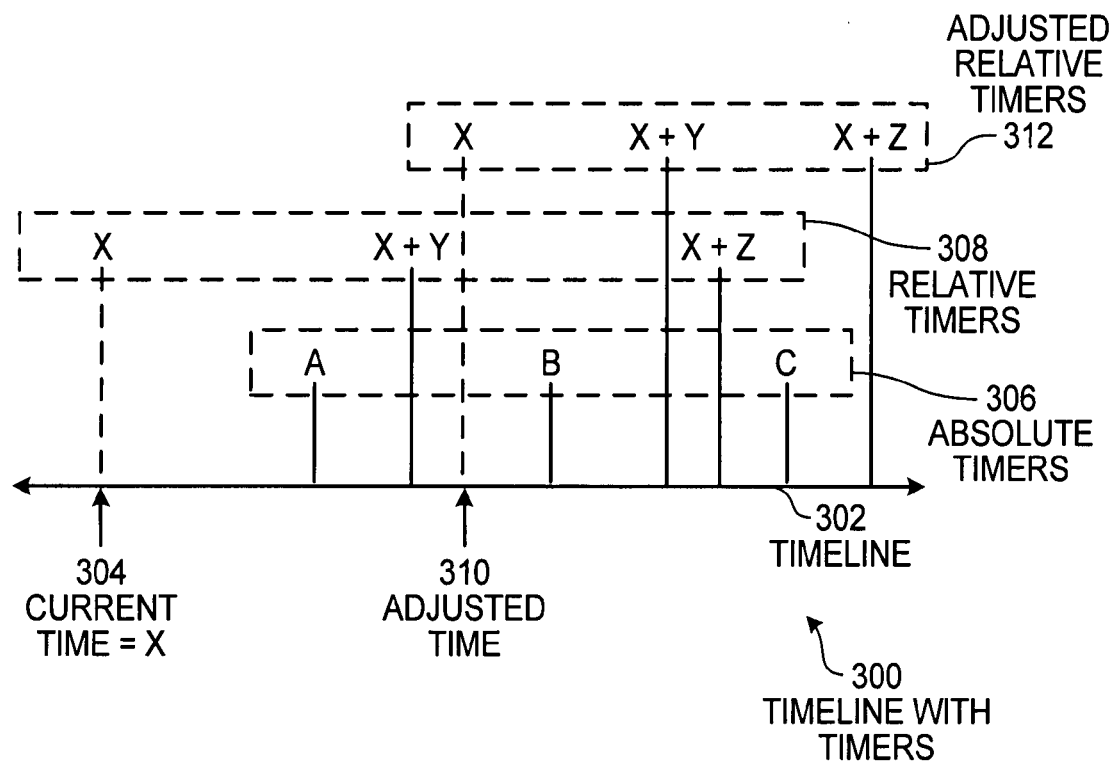
FIG. 3A is a diagram illustration of a first embodiment showing a timeline with adjusted timers.

FIG. 3A is a diagram illustration of an embodiment 300 showing a timeline with various timers. The timeline 302 has a current system time 304 shown, along with a set of absolute timers 306 and relative timers 308. The timeline 302 illustrates the system time of the system clock, not actual time.

The absolute timers 306 comprise timers listed A, B, and C and are fixed with respect to the timeline. The relative timers 308 are shown as X+Y and X+Z, with X being the current time. The relative timers are designed to expire at a designated delay from the current time.

When the current time is adjusted to time 310, the timer A in the absolute timers 306 has come due, but the relative timers are adjusted 312 so that the same delay in time occurs regardless of the adjustment made to the system time.

The current time may be adjusted for many different reasons, including daylight savings time, moving from one time zone to another, or for synchronizing the system clock of a device with another time source, such as an atomic clock standard.

Figure 3B:
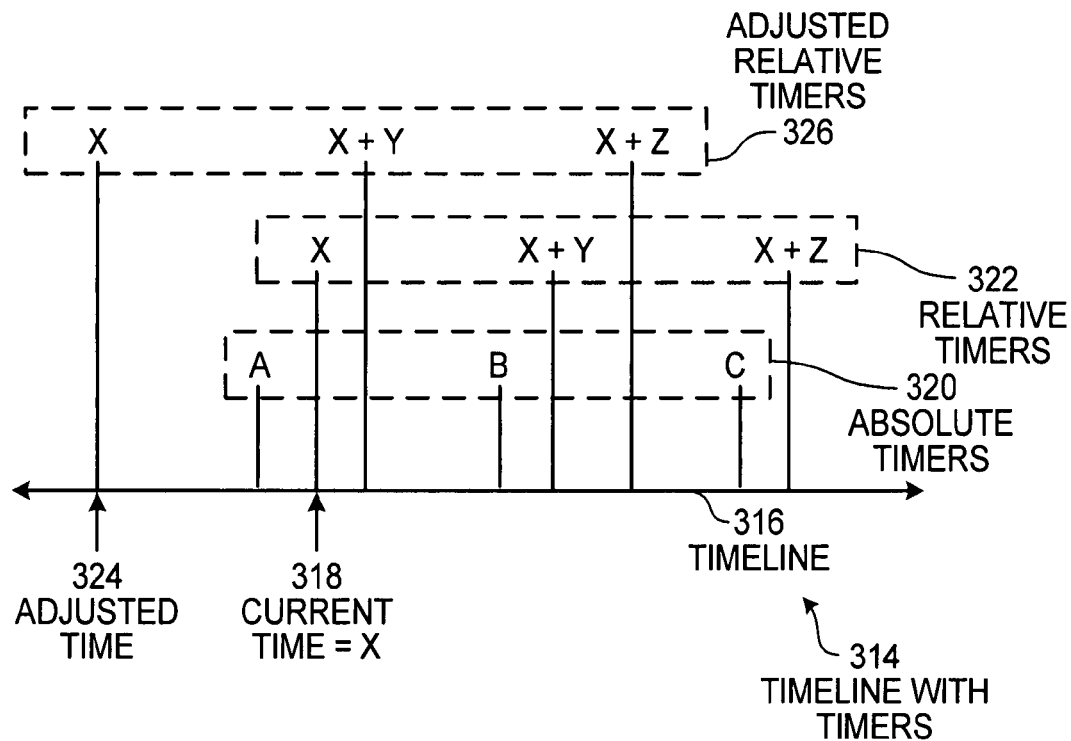
FIG. 3B is a diagram illustration of a second embodiment showing a timeline with adjusted timers.

FIG. 3B is another diagram illustration of an embodiment 314 showing a timeline with various timers. The timeline 316 is a system timeline and shows a current system time 318, some absolute timers 320, and a group of relative timers 322.

As with FIG. 3B, the absolute timers 320 comprise timers listed A, B, and C and are fixed with respect to the timeline. The relative timers 322 are shown as X+Y and X+Z, with X being the current time. The relative timers are designed to expire at a designated delay from whatever the current time is.

When the system clock is adjusted backwards to the adjusted time 324, the adjusted relative timers 326 may also be adjusted. Because the relative timers are defined as a delay from the current time, the adjusted relative timers 326 illustrate when the relative timers 322 would occur. The adjusted relative timers 326 are not reset or changed, but will appear to occur sooner in system time than they would have before the system time was adjusted.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed by computer device operating a single software service performing said method, said method comprising:
   receiving a timer request;
   determining that said timer request is either an absolute or relative timer;
   storing said timer request in either a first array comprising absolute timers or a second array comprising relative timers;
   aggregating said first array of absolute timers and said second array of relative timers into a single timer function, wherein multiple timer functions that would otherwise use multiple computing resources are consolidated into said single timer function; and
   starting said single timer function adapted to return based on an earliest of said absolute timers and an earliest of said relative timers.

2. The method of claim 1, said timer request comprising a work item to execute.

3. The method of claim 2, said timer request further comprising a context to pass to said work item.

4. The method of claim 1, said timer request being periodic.

5. The method of claim 1 further comprising:
   sorting said first array to determine said earliest absolute timer; and
   sorting said second array to determine said earliest relative timer.

6. The method of claim 1, said timer function comprising a timeout function using said earliest relative timer.

7. The method of claim 1 further comprising:
   interrupting said timer function when a new timer request is received.

8. The method of claim 1 further comprising:
   interrupting said timer function when a new timer request is stored.

9. A computer readable storage media comprising computer executable instructions adapted to perform the method of claim 1.

10. A computer device operating a timer service comprising:
    a first array comprising absolute timers;
    a second array comprising relative timers;

an input function adapted to receive a timer request and store said timer request in either said first array or said second array; and a single timer function comprising an aggregation of said first array of absolute timers and said second array of relative timers into a single timer function, said single timer function determining an earliest absolute timer and an earliest relative timer, said timer function being adapted to return when the earliest of said earliest absolute timer or said earliest relative timer occurs;

said timer service operating on a computer device as a single software process.

11. The timer service of claim 10, said timer request comprising a work item to execute.

12. The timer service of claim 11, said timer request further comprising a context to pass to said work item.

13. The timer service of claim 10, said timer request being periodic.

14. The timer service of claim 10, said first array being a sorted array and said second array being a sorted array.

15. The timer service of claim 10, said timer function further comprising a timeout function using said earliest relative timer.

16. The timer service of claim 10 further comprising:
an interruption function adapted to interrupt said timer function after a new timer request is received.

17. A hardware system comprising:
a system clock; and
a timer service operating on said system as a single process, said timer service that:
receives a timer request;
determines that said timer request is either an absolute or relative timer;
stores said timer request in either a first array comprising absolute timers or a second array comprising relative timers;
aggregating said first array of absolute timers and said second array of relative timers into a single timer function, wherein multiple timer functions that would otherwise use multiple computing resources are consolidated into said single timer function; and
starts said single timer function adapted to return based on an earliest of said absolute timers and an earliest of said relative timers.

18. The system of claim 17, said timer request comprising a work item to execute and a context to pass to said work item.

19. The system of claim 17, said timer function comprising a timeout function using said earliest relative timer.

20. The system of claim 17 said timer service that further:
interrupts said timer function after a new timer request is received.

* * * * *